Figure 1:
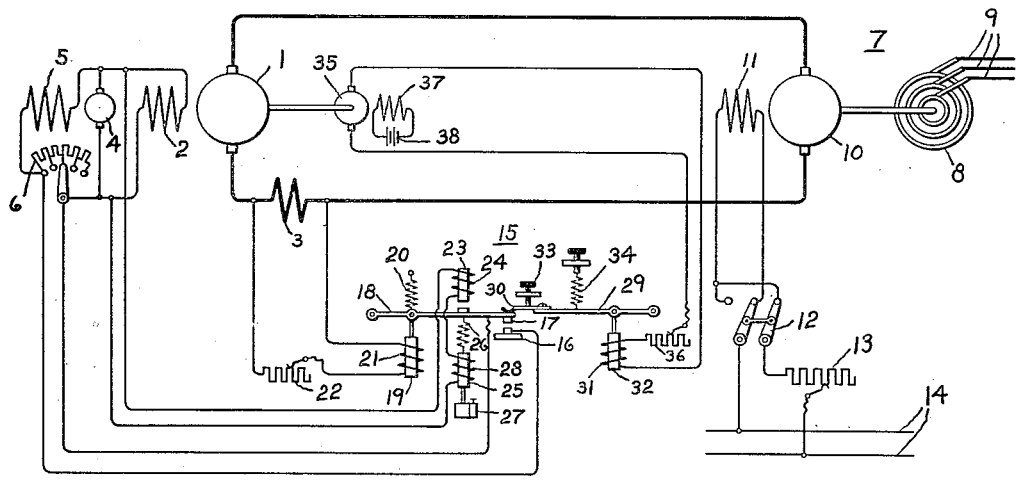

Sept. 17, 1929.  F. A. BYLES  1,728,853

ELECTRICAL REGULATOR

Filed Jan. 7, 1928

Inventor:
Frank A. Byles,
by Charles E. Tullar
His Attorney.

Patented Sept. 17, 1929

1,728,853

UNITED STATES PATENT OFFICE

FRANK A. BYLES, OF SCHENECTADY, NEW YORK, ASSIGNOR TO GENERAL ELECTRIC COMPANY, A CORPORATION OF NEW YORK

ELECTRICAL REGULATOR

Application filed January 7, 1928. Serial No. 245,219.

My invention relates to electrical regulators and more particularly to regulators and regulating systems for controlling the excitation of a dynamo-electric machine to control an electrical characteristic thereof.

In the operation of a dynamo-electric machine it is often desirable to maintain an electrical characteristic of the machine, such for example, as the voltage, current, power, etc., at a constant value over one portion of the range of operation and to vary said characteristic in a predetermined manner over another portion of the range of operation. For example, in the operation of reversing rolling mill motors it is sometimes desirable to limit the current traversing the armature circuit of the main drive motors to a predetermined value and substantially to maintain the current at the predetermined value during any tendency for greater current flow throughout the operating speed range of the motor. In controlling reversing mill motors it is common practice to use a variable voltage generator for speed control up to a predetermined speed value and to use the combination of variable voltage across the armature circuit and rheostatic regulation of the main motor field for speed control above the predetermined speed value. With such an arrangement it becomes more and more difficult to obtain successful commutation at the higher speeds with the predetermined current limit maintained during the lower speed range without unduly raising the cost of the motor. Furthermore, it is often desirable for purposes of economy to reduce the current limit maintained over predetermined portions of the duty cycle to a lower limit when the load on the motor does not require an output proportional to the current limit previously maintained.

It is an object of my invention to provide a new and improved regulator and system of regulation for controlling an electrical characteristic of a dynamo-electric machine in a different manner over different portions of its range of operation.

A further object of my invention is to provide a new and improved regulator and system of regulation for limiting the current traversing the armature circuit of an electric motor to a predetermined value and substantially to maintain the current at the predetermined value during any tendency for greater current flow throughout a predetermined speed range, and for decreasing the predetermined current limit in accordance with changes in speed of the motor above the predetermined speed range.

My invention will be better understood by reference to the following description taken in connection with the accompanying drawing, and its scope will be pointed out in the appended claims.

Figure 2:
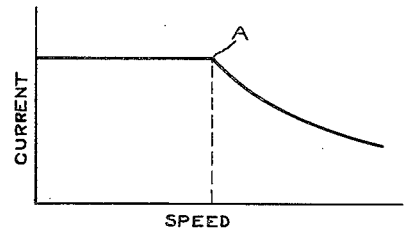

In the accompanying drawing, Fig. 1 is a diagrammatic representation of an embodiment of my invention for controlling the current traversing the armature circuit of a direct current motor, and Fig. 2 is a curve illustrating in a general way the relation between current and speed for the regulating system shown in Fig. 1.

Referring to Fig. 1 of the drawing, 1 indicates a dynamo-electric machine shown as a direct-current motor having a field winding 2 arranged to be energized from a separate source of electrical energy and a field winding 3, such for example as an interpole winding or a series compounding winding, which is energized in accordance with the current traversing the armature circuit of the motor. The field winding 2 is connected to be energized by an exciter 4 which is provided with a shunt connected field winding 5 having a regulating resistance 6 in series therewith. The motor 1 may be driven by any suitable source of power but for purposes of illustration I have shown a motor generator set 7 comprising an alternating current motor 8 energized from the conductors 9 and mechanically connected to drive a variable voltage generator 10 which is connected to the armature circuit of motor 1. The generator 10 is provided with a field winding 11 which is connected through a suitable reversing switch 12 and regulating resistance 13 to constant voltage supply conductors 14 to permit the voltage of generator 10 to be reversed and varied over a wide range in a manner well-known in the art.

For controlling any desired electrical characteristic of motor 1, I provide a regulator 15 which comprises cooperating contacts 16 and 17 adapted to vary the excitation of exciter 4 by rapidly opening and closing a circuit in shunt to resistance 6. For simplicity of illustration these contacts are shown as operating directly across resistor 6 but as is well-known an intermediate relay which is controlled by the primary contacts 16 and 17 may be used in practice if preferred without departing from my invention in its broader aspects. Contact 16 may be fixed in position and contact 17 cooperating therewith is supported on a contact arm 18 which is actuated by a core 19 connected thereto. A spring 20 is connected to the arm 18 to exert a pull in opposition to the pull exerted by core 19. The core 19 is arranged to change the relative position of the contacts under the influence of a winding 21 which is connected to be energized in accordance with the electrical characteristic which is to be controlled and as shown is connected across the series field winding 3 through an adjustable resistance 22 to be responsive to the current traversing the armature circuit of motor 1. An anti-hunting means comprising a core 23 and a winding 24 is arranged in operative relation on one side of the contact arm 18, and means for compensating for the under-compounding tendency of the anti-hunting means is connected in operative relation with the contact arm and comprises a plunger 25 connected to the arm 18 by means of a resilient connection 26, a dash-pot 27 for controlling the movement of the core 25, and a winding 28 for operating the core 25. The windings 24 and 28 are arranged to exert opposite pulls on the contact arm 18 and are connected to be responsive to an electrical characteristic of the excitation circuit of the motor and as shown are connected to be responsive to the voltage applied to field winding 2.

The movement of contact arm 18 and the regulation effected thereby is arranged to be modified by means responsive to the speed of motor 1. For this purpose I provide an arm 29 supporting a spring 30 which is arranged to exert a varying force upon contact arm 18 depending upon the position of arm 29. Arm 29 is actuated by an electromagnet comprising a winding 31 for actuating a plunger 32 which is connected to the arm. The movement of arm 29 away from arm 18 is controlled by a stop 33. The pull of plunger 32 and the action of spring 30 upon arm 18 may be varied by an adjusting means shown as an adjustable spring 34. Winding 31 is to be energized in accordance with the speed of the machine to be controlled and for this purpose I provide a pilot generator 35 which is electrically connected to winding 31 through an adjustable resistance 36 and mechanically connected to rotate with motor 1 so that the voltage thereof is proportional to the speed of the motor. The pilot generator may be of any suitable type, such for example as a generator of the magneto type, but preferably it comprises a small direct current generator of usual construction with a field winding 37 connected to any suitable source such as a battery 38 or any other convenient source of regulated voltage which will permit generator 35 to have a constant field excitation.

The operation of the arrangement shown is substantially as follows: Let it be assumed that the exciter 4 is in operation and energizing field winding 2, and that the motor-generator set 7 is in operation and supplying a voltage to operate motor 1. First suppose that motor 1 is operating at some speed within its lower speed range. At the instant when the contact arm 18 is in the position shown the circuit in shunt to the regulating resistance 6 will be open and the voltage impressed on field winding 2 will be a minimum. The winding 24 of regulator 15 will at this instant have a minimum energization and if the current traversing the armature circuit tends to exceed the predetermined limit the pull of winding 21 will cause arm 18 to move so that contacts 16 and 17 will be engaged. Upon engagement of contacts 16 and 17 the regulating resistance 6 is short circuited so that the voltage impressed on field winding 2 will be increased toward a maximum value. Upon the increase in voltage across field winding 2 the energization of winding 24 will increase, whereupon member 18 will be moved to disengage contacts 16 and 17. Upon disengagement of contacts 16 and 17 the circuit in shunt to the regulating resistor 6 becomes effective and the voltage impressed across the field winding 2 is reduced toward a minimum. This cycle of operation is rapidly repeated and the member 18 is rapidly vibrated by the anti-hunting winding. The anti-hunting winding 24 has a tendency to undercompound as the average value of the voltage applied to field winding 2 increases, but the means comprising the core 25, resilient connection 26, and winding 28 will permit any desired degree of compensation. As the voltage across field winding 2 increases, winding 28 tends to draw down the end of member 18 in opposition to the pull of winding 24 which is in the opposite direction. The spring 26 permits free vibration of the member 18, while the dash-pot 27 dampens the movement of the core 25. If the current traversing the armature circuit of motor 1 tends to exceed the predetermined limit which is to be maintained constant, the energization of winding 21 will be increased so that the position of the vibrating member 18 will be moved to close contacts 16 and 17 and thereby increase the value of the voltage applied to field winding 2. The variation in the energization of field winding 2 modifies the speed of motor 1 in the manner necessary to limit the current traversing the armature circuit to the predetermined value.

Now if the motor speed has been increased to exceed the predetermined value in maintaining the current constant, for example as indicated at A on the curve shown in Fig. 2, arm 29 is brought into action. In the particular arrangement shown the voltage of the pilot generator 35 at speeds below the predetermined speed does not energize winding 31 sufficiently to overcome the pull of spring 34 but at the predetermined speed plunger 32 under the action of winding 31 begins to pull arm 29 in a manner to exert a force on arm 18 so as to change the force exerted on arm 18 to shorten the period during which the contacts 16 and 17 are separated. This modifying action changes in accordance with the change in speed of motor 1 and as the speed increases the contacts 16 and 17 are in engagement an increasingly greater portion of the time. As a result the current traversing the armature circuit of motor 1 is decreased in a predetermined manner as the speed of the motor increases. The calibration of the regulator winding 21 and the modifying winding 31 may be changed by means of the adjustable resistances 22 and 36 respectively.

While I have shown and described a particular embodiment of my invention it will be apparent to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:—

1. In combination, a dynamo-electric machine, a relay having cooperating vibratory contacts and connected to be responsive to an electrical characteristic of said dynamo-electric machine for maintaining substantially constant said electrical characteristic over a predetermined operating range, and electroresponsive means for modifying the movement of one of said contacts for varying said electrical characteristic in a predetermined manner beyond said predetermined range of operation.

2. In combination, a dynamo-electric machine, a relay comprising vibratory contacts and connected to be responsive to an electrical characteristic of said dynamo-electric machine for maintaining substantially constant said electrical characteristic throughout a predetermined range of operation, and means responsive to a change in an electrical characteristic varying in response to an operating condition of said dynamo-electric machine for modifying the action of one of said vibratory contacts to vary said electrical characteristic in a predetermined manner beyond said predetermined range of operation.

3. In combination, a dynamo-electric machine, a regulator for controlling an electrical characteristic of said dynamo-electric machine in a predetermined manner over a predetermined portion of the operating range of said dynamo-electric machine, and means responsive to the speed of said dynamo-electric machine for modifying the action of said regulator to control said electrical characteristic in a different predetermined manner beyond said portion of the operating range of said dynamo-electric machine.

4. In combination, a dynamo-electric machine, a regulator for maintaining substantially constant an electrical characteristic of said dynamo-electric machine for a predetermined range of operation and for changing said electrical characteristic in a predetermined manner in accordance with the speed of said dynamo-electric machine above said predetermined range of operation.

5. In combination, a dynamo-electric machine having an armature circuit, a regulator for limiting the current traversing said armature circuit to a predetermined value and for maintaining the current substantially at the predetermined value during any tendency for a greater curent flow for a predetermined range of speed, and means for modifying the operation of said regulator to decrease said predetermined current limit in accordance with the speed of said dynamo-electric machine during operation of said dynamo-electric machine above said predetermined range of speed.

6. In combination, a dynamo-electric machine, a field winding therefor, means operatively associated with said dynamo-electric machine for supplying a voltage proportional to the speed thereof, a source of electrical energy connected to said excitation circuit, means for controlling the voltage of said source of electrical energy, a regulator responsive to the current traversing said dynamo-electric machine for controlling said second mentioned means, and means connected to be responsive to the voltage of said first mentioned means for modifying the operation of said regulator.

7. In combination, an electric motor having an armature winding and a field winding, a generator mechanically connected to said motor and arranged to generate a voltage proportional to the speed of said motor, an exciter connected to said field winding, a resistor for controlling the voltage of said exciter, a regulator responsive to the current traversing said armature winding and comprising cooperating vibrating contacts for controlling said resistor, and means connected to be responsive to the voltage of said generator for modifying the period during which said contacts are in engagement.

8. In combination, a dynamo-electric machine, an excitation circuit therefor, a vibratory relay having a winding responsive to the current traversing said dynamo-electric machine for controlling an electrical characteristic of said excitation circuit, and means operative in accordance with the speed of said dynamo-electric machine for modifying the operation of said vibratory relay.

9. In combination, a dynamo-electric machine, an excitation circuit therefor, a vibratory relay comprising cooperating contacts and a winding responsive to the current traversing said dynamo-electric machine for controlling the voltage of said excitation circuit, an anti-hunting winding for said relay controlled by the operation thereof, a compensating winding controlled by the operation of said vibratory relay and acting in opposition to said anti-hunting winding, means operatively associated with one of said contacts for changing the period of engagement of said contacts, and a winding energized in accordance with the speed of said dynamo-electric machine for controlling said means.

10. In a regulating system, an electric motor comprising an armature circuit and a field circuit, a variable voltage means connected to said armature circuit for controlling the speed of said motor, a source of electrical energy for energizing said field circuit, a regulator for controlling said source of electrical energy to control the speed of said motor in cooperation with said variable voltage means and for limiting and maintaining the current at a predetermined value when the current flow tends to exceed said predetermined value for a predetermined speed range, and means responsive to the speed of said motor for modifying the operation of said regulator to limit and maintain the current at values decreasing as the speed increases above the predetermined speed range.

In witness whereof, I have hereunto set my hand this 6th day of January, 1928.

FRANK A. BYLES.